Patented Aug. 24, 1926.

1,597,103

UNITED STATES PATENT OFFICE.

HYNEK OBERHERR, OF PRAGUE, CZECHOSLOVAKIA.

PROCESS OF MAKING ARTIFICIAL MARBLE AND PRODUCT MADE THEREBY.

No Drawing. Application filed February 12, 1924, Serial No. 692,421, and in Czechoslovakia October 28, 1923.

Hitherto artificial marble has been produced almost exclusively according to one or other of two processes namely from gypsum with the addition of Sorell cement or from Portland cement with the addition of coarse grained marble chips.

The artificial marble produced from gypsum is not suitable for the production of plates for articles of furniture particularly large plates such for example as are required for tables, sideboards and the like. Such artificial marble is also very friable, and does not retain its polish. For these reasons it is only used for covering walls, for which purpose it is not produced in the form of plates but is applied directly to the wall and results in cracks and fissures in a short time.

The artificial marble produced from Portland cement is more durable but does not possess a handsome appearance and is not in the least like marble, this being particularly conspicuous in the case of large surfaces. The colour effects are obtained by the addition of differently coloured marble chips, which also has a disturbing effect. Plates may be produced from this artificial marble, but in view of their poor appearance they are not used for furniture and wall coverings, as the large marble chips have a disturbing effect and moreover it is only the marble chips in such plates that are well polished whilst the cement between the chips has only a non-durable flat or dull polish.

Artificial marble according to the present invention has the hardness and firmness of Terrazzo and in appearance it is quite similar to natural marble. Further this artificial marble has all the properties required of artificial marble as it can be washed with soap and soda and older plates may be so treated that they are capable of withstanding organic acids.

Artificial marble according to this invention is produced from Portland cement pulverized colours and either chalk, sulphur or marble flour. As a specific example, one mixture used comprises in parts by weight, chalk 25, cement 10, and pigment ½. These relative quantities, however, can be varied considerably without materially changing the resulting product or departing from the invention. This mixture is ground to such fineness that it is not even possible to recognize the separate constituents by means of a microscope. After the grinding the mixture is treated with water to form a plastic mass. Variously coloured masses produced in this manner are then mixed together so as to obtain differently coloured veins. A thin layer of this coloured mass is then placed into a mold and the mold is filled with cement mortar. In this manner objects of various shape, especially plates, can be produced. Alternatively, the whole mold may also be filled completely with the fine material so that the use of cement mortar becomes unnecessary.

After drying, which requires three to four days, the plates are removed from the mold and ground with the continual supply of water. The material can also be pressed while in the mould to remove the excess water, and then removed from the mould to dry outside thereof. The plate, still moist, is then filled in where necessary with a mass of chalk, cement and colour. The mass has the property of adhering firmly to the plate and completely fills any blisters formed when molding or casting.

When filling in with cement and colour only, that is to say without chalk, it frequently occurs that these repaired portions are softer and thinner and are ground out during grinding. When chalk is used in addition to the cement and colour the repaired portions are as compact as the remainder of the plate and by a grinding operation these repaired portions acquire a smooth surface similar to the rest of the plate.

After drying the repaired plate it is immersed for from one to two hours in a 2 to 3% magnesium fluoride solution.

After being again dried the plate is ground smoothly and is then ready for polishing.

The polishing differs from the polishing methods hitherto known in that the high polish is obtained by magnesium fluoride and water glass solution.

After grinding the plate, it is polished with red colour (rouge) as is usual for polishing with hard stones, but the colour is prepared with magnesium fluoride solution instead of with water as hitherto. After obtaining a slight polish dilute water glass solution is rubbed into the still moist surface by means of damp cloths. In this manner the water glass is caused to adhere firmly to the polished surface and forms a shiny glaze with the fluoride.

The use of water glass in combination with magnesium fluoride solution is quite novel and important because it is only possible to cause the water glass to bind on the cement surface in this manner. Water glass applied without fluoride easily peels off after drying and can only be spread uniformly with trouble to produce a shiny surface. Water glass when it has penetrated into the cement crystallizes on the surface, if not combined with fluoride, especially when the finished plate is wet and then dried.

Instead of chalk it is possible to use:—

(a) sulphur, which produces an artificial marble capable of withstanding organic acids. The same mass may be used for repairing faulty portions of the molded article.

(b) marble flour of fine marble grains of a diameter of about 0.2 mm. In the production of artificial marble with the addition of marble flour the operation is as follows:—

After the first grinding, before filling up, it is necessary to treat the plate with magnesium fluoride solution. The treatment with fluoride is absolutely necessary for further operation, (filling up the plates, grinding and polishing) as before this treatment the plate would not have a uniform hardness, for example, the yellow coloured parts have a different degree of hardness to the red coloured parts and the softer parts would be ground more coarsely. This disadvantage is obviated by treatment with fluoride and a uniformly hard surface is obtained. The repairing of the blisters is not effected by the addition of marble flour but with the addition of chalk. The further operations are the same as when producing artificial marble with the addition of chalk.

What I claim and desire to secure by Letters Patent is:—

1. A process for making artificial stone resembling marble, comprising mixing chalk, Portland cement, and a pigment, with sufficient water to form a plastic mass, moulding the plastic mass to desired form, allowing it to harden and then successively polishing it with a fluoride solution and a water glass solution.

2. An artificial stone having a body portion formed of chalk, Portland cement and pigment, and a polished surface formed of a layer of magnesium fluoride and a layer of water glass.

3. An artificial stone having a body portion formed of chalk, Portland cement and pigment, and a polished surface formed of a layer of magnesium fluoride and a layer of water glass, the fluoride layer being positioned between the body of the stone and the water glass layer.

In testimony whereof, I have signed my name to this specification.

HYNEK OBERHERR.